Patented Apr. 13, 1937

2,076,646

UNITED STATES PATENT OFFICE 2,076,646

PROCESS FOR DEAERATING GRANULES OF ACTIVE CARBON

Heber A. Ingols, Wilmington, and Paul F. Pie, Jr., Newark, Del., assignors to Darco Corporation, Wilmington, Del., a corporation of Delaware No Drawing. Application December 20, 1935, Serial No. 55,429

2 Claims. (Cl. 252—3)

This invention relates to granular activated carbon and consists in a process for treating granular activated carbon to render the carbon sinkable in water.

Granular activated carbon is frequently used in the form of a filter bed, and the liquid or gas being treated is passed through the bed of carbon. In the treatment of water with granular carbon, it has been customary to pass the water downwardly through the bed of carbon. Occasionally these down-flow filters are "back-washed" by an upward flow of water through the bed of carbon. It has also been proposed that the carbon beds be normally operated with an upward flow of water.

A difficulty heretofore encountered with certain types of granular activated carbon is that when placed in water the carbon has a tendency to wet slowly and to float or merely suspend itself in the water. This refusal of the carbon to sink and form a bed prevents the full use of the carbon during periods of downward flow. A portion of the carbon floats above the liquid surface and is unavailable as adsorption surface. In addition the submerged portion of the carbon is not properly wetted and the pores are inaccessible to the substances which the carbon can adsorb. Furthermore, during periods of upward flow, the floating carbon is frequently washed out of the filter and lost.

These difficulties are accentuated when it is desired to operate the filter normally with an upward flow of water. The non-sinkable carbon will be carried out of the filter unless a screen is provided above the carbon to retain the carbon in the filter. The addition of an upper screen renders the carbon bed inaccessible, increases the resistance to the flow of water, and is otherwise disadvantageous. Accordingly, non-sinkable activated carbons are generally considered to be unsuitable for use in water filters.

An object of this invention is the production of a sinkable granular activated carbon.

Another object of this invention is the production of a sinkable granular activated carbon from non-sinkable granular activated carbon.

A still further object of this invention is the provision of a process for treating non-sinkable granular activated carbon to render it sinkable, which may be carried out with relatively simple equipment and without the necessity of returning the non-sinkable carbon to the activating equipment.

Other objects of the invention will hereinafter more fully appear.

We have found that non-sinkable activated carbons, having a block density below 1.0 grams per cubic centimeter, may be treated to render them sinkable and readily wettable by expelling the air or gas from the pores of the carbon and replacing the air or gas with water. Granular carbons tenaciously retain entrained air or gas, and once adsorbed, mere submergence or agitation of the granules in water will not render the carbon sinkable. If, however, the air or gas is forcefully expelled from the carbon and replaced with water, the granules of carbon will sink quickly when placed in water and a bed of carbon so treated is not easily disturbed or agitated by an upward current of water such as is used to back-wash filters.

The process may be carried out by placing the non-sinkable activated carbon in a vessel containing water and subjecting the vessel to a vacuum. The air and non-condensable gases will expand and escape from the pores. Upon release of the vacuum the water will enter the pores, or in the event that the carbon is not completely submerged, the water vapor will enter the pores and condense therein, causing the granules to sink.

Another preferred embodiment of the process is carried out by placing the non-sinkable activated carbon in water and boiling the mixture. The gas in the pores of the carbon will expand and escape and water vapor will enter the pores and condense therein, filling the pores. The carbon is found to be readily wettable and sinkable in water.

However, it is not necessary to heat a large body of water with the carbon granules. We have found that the process may be carried out by merely moistening the granules with water, heating the moist granules to 100° C., maintaining that temperature for a few minutes, and then mixing the carbon with cold water. The steam which is formed during the short period of heating sweeps the air away from the carbon and also enters the pores of the granules. When the granules are mixed with cold water, the steam in the pores condenses and the pores become filled with water.

We have found that non-sinkable granular activated carbon, after treatment as indicated above, is readily wettable and sinkable in water. Whereas before treatment at least a portion of the carbon floated and the remainder appeared to be merely suspended and refused to form a firm bed, after treatment all the carbon granules sank immediately in the filter and formed a firm, compact bed. Upward flow of the water failed to disturb the bed of sinkable carbon and the difficulties previously encountered with the non-sinkable granules were completely eliminated.

In addition to causing the granules of activated carbon to become sinkable, the displacement of gas from the pores by water renders the pores accessible to the substances which the carbon can adsorb, and thus the apparent activity or adsorptive capacity of the carbon is enhanced.

In the claims, by the term "granular carbon" is meant a carbon having granules which are sufficiently large so that practically all will be retained by a 30 mesh sieve. By "block density" is meant the density in grams per cubic centimeter as measured in mercury. By "moisture" and "water" is meant moisture and water consisting essentially of $H_2O$.

In our copending application, Serial No. 55,428, filed of even date herewith, we have disclosed and claimed a process of preparing granular activated carbon for use in the purification of aqueous mediums having a block density greater than 1.0, by cooling the carbon in an atmosphere of steam.

What we claim is as follows:

1. The process of preparing sinkable granular activated carbon for use in the purification of aqueous mediums from non-sinkable granular activated carbon having a block density less than 1.0 grams per cubic centimeter which comprises placing the non-sinkable carbon in water and boiling the mixture to thereby produce a sinkable granular activated carbon having a block density greater than 1.0 grams per cubic centimeter.

2. The process of preparing sinkable granular activated carbon for use in the purification of aqueous mediums from non-sinkable granular activated carbon having a block density less than 1.0 grams per cubic centimeter which comprises moistening the non-sinkable granules with water, heating the moist granules to 100° C., until the water boils and mixing the hot carbon granules with water to thereby produce a sinkable granular activated carbon having a block density greater than 1.0 grams per cubic centimeter.

HEBER A. INGOLS.
PAUL F. PIE, Jr.